(No Model.) 2 Sheets—Sheet 1.
M. HOFBAUER.
MEAT CUTTER.
No. 441,663. Patented Dec. 2, 1890.
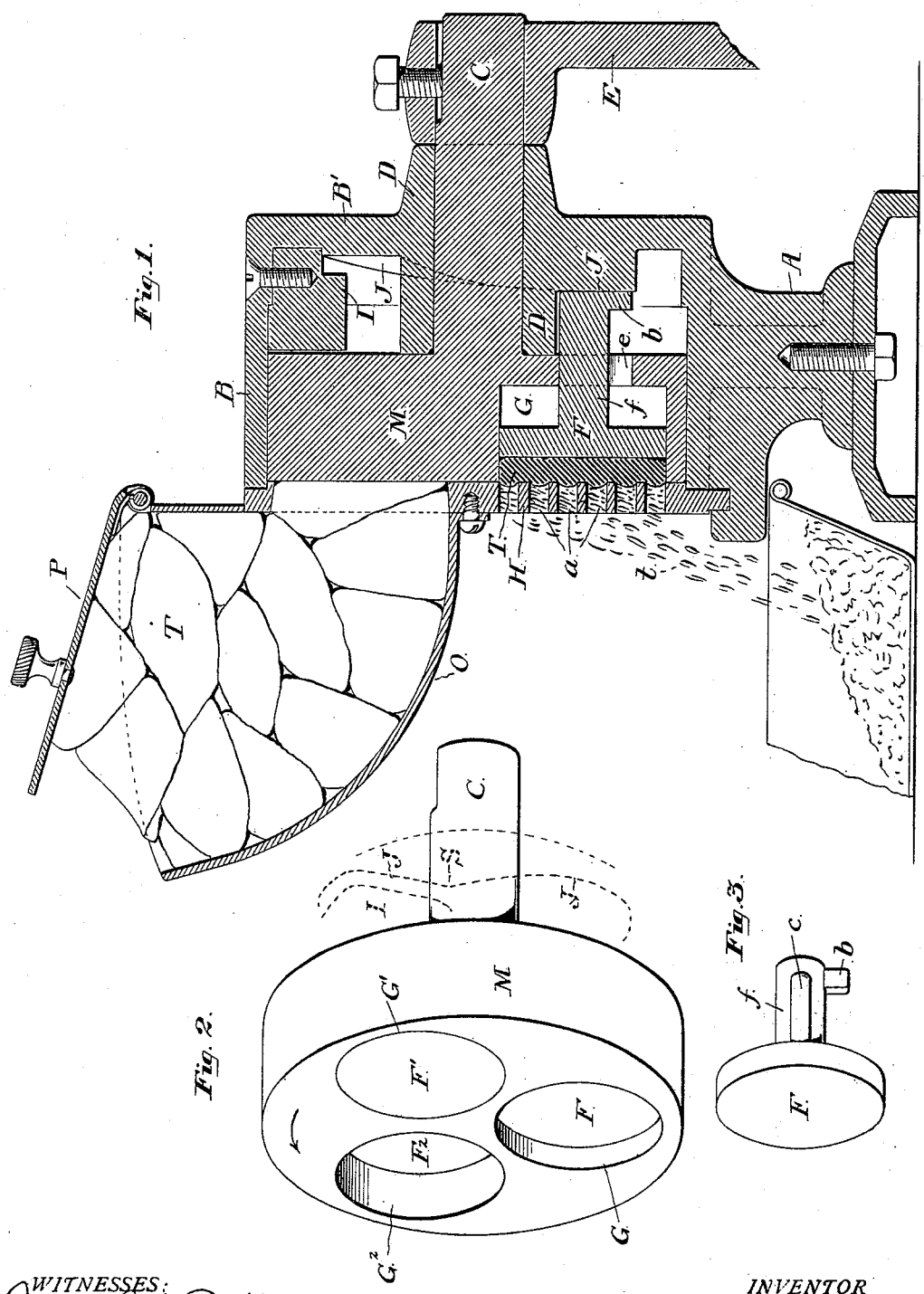

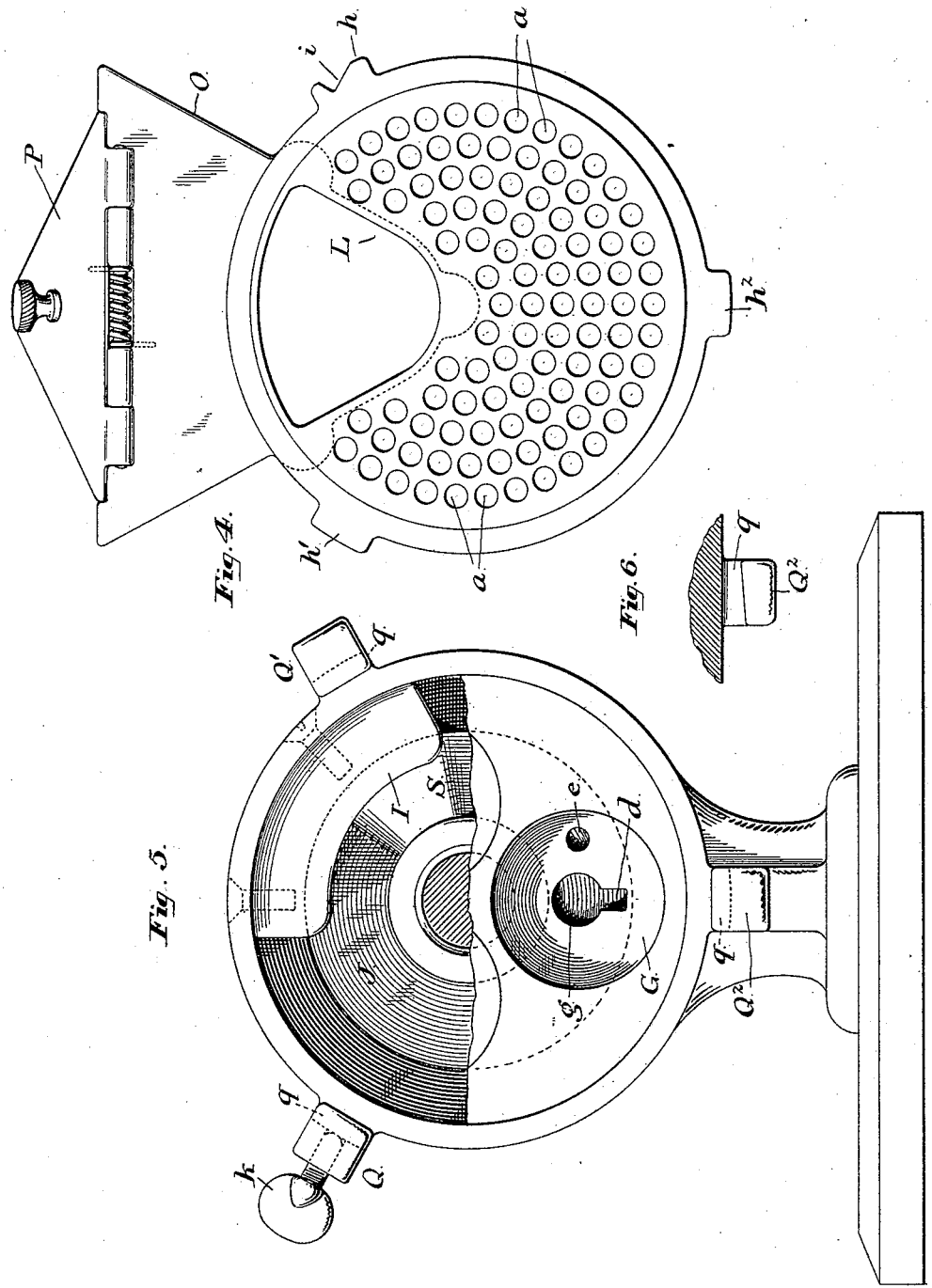

UNITED STATES PATENT OFFICE.

MICHAEL HOFBAUER, OF PHILADELPHIA, PENNSYLVANIA.

MEAT-CUTTER.

SPECIFICATION forming part of Letters Patent No. 441,663, dated December 2, 1890.

Application filed May 29, 1889. Serial No. 312,645. (No model.)

*To all whom it may concern:*

Be it known that I, MICHAEL HOFBAUER, of Philadelphia, in the State of Pennsylvania, have invented certain new and useful Improvements in Meat-Cutters, whereof the following is a specification, reference being had to the accompanying drawings.

My invention belongs to that class of cutters which operate by rotation and are intended to reduce the meat into very small pieces. The most common of these machines are those in which the meat, after more or less preliminary cutting, is introduced into a hollow cylinder, one end of which is closed by a perforated plate, the meat being forced against said plate by the action of a screw within the cylinder and cut by the sharp edges at the perforations. I have found that this type of machine is open to various objections, among the most prominent of which are the following: The meat is liable to become wrapped around the screw, so as not to be fed forward by it. When the cutting has been completed as far as possible, there will always be found within the cylinder a certain amount of uncut meat which the screw cannot properly force against the plate. In case pieces of bone or other hard substance being carried into the machine it is almost impossible to remove them without detaching the plate, and the machine must be taken apart in order to clean it.

My present improvement is intended to remedy all these difficulties, and I accomplish this by introducing the meat at that end of the cylinder to which the perforated plate is affixed, and in order to force it against said plate I provide a head or thick disk rotating against the inner side of the plate and having upon the side adjacent to the plate cavities containing followers which alternately recede from and approach toward the perforated plate. The motion of said followers is so timed that when a cavity is opposite to the aperture by which the meat enters the follower is retracted into its innermost position, thus leaving the cavity open to receive the meat, and as the head rotates the followers gradually move forward until they are substantially flush with the surface of the head. Other minor features of improvement will be referred to later on.

In the drawings, Figure 1 represents a vertical longitudinal section through the apparatus on a plane passing through the axis of rotation of the head. Fig. 2 is a view of the head detached from the other portions of the machine, showing in dotted lines the configuration of the cams by which the proper motion is given to the followers. Fig. 3 is a detail view of a follower. Fig. 4 is a view from the rear of the perforated plate and meat-hopper detached from the machine. Fig. 5 is a front or end view of the cylinder with the perforated plate removed, a part of the head being represented as broken away in order to show the position of the cams which actuate the followers; and Fig. 6 is a detail view of one of the fastening-lugs, by which the plate is adjustably secured to the end of the cylinder.

Upon a suitable base A is mounted the hollow cylinder B, closed at the rear end B', except at its center, where an elongated hollow hub D is formed to permit the passage of and afford a bearing for the shaft C of the rotating head M. The outer end of the shaft C is provided with a crank-arm E, to which a suitable handle (not shown) is attached.

The rotating head M is shown fully in Fig. 2, and consists of a thick disk of metal having in this instance three circular cavities G G' $G^2$ in its outer or front end. These cavities are preferably from five-eighths to three-fourths of an inch deep, and their diameter is as great as is consistent with the proper strength of the surrounding walls. At the bottom of each cavity (see Fig. 5) is a central hole $g$, with a lateral offset $d$ to permit the introduction of the follower-shaft, and adjacent to the hole $g$ is a smaller hole $e$, adapted to receive a guide-stem mounted upon the follower.

The followers F F' $F^2$ fit snugly in the cavities G G' $G^2$, respectively, and are constructed as shown in Fig. 3—that is to say, each of them has a central shaft $f$, provided at its end with a laterally-projecting toe $b$, and adjacent to and parallel with the shaft $f$ is a guide-stem $c$, which fits snugly within the hole $e$.

The object of the offset $d$, communicating with the hole $g$, is to permit the passage of the toe $b$ upon the follower-shaft, while the follower is being inserted in position. The object of the guide-stem c is to prevent the followers from rotating in the cavities, and to thus maintain the toes b in a substantially radial position to engage with the acting cams. These cams I J, respectively, are cast upon or otherwise secured to the cylinder B near its rear end, and their general configuration is mainly shown in Fig. 2, while their relation to certain of the other parts is indicated in Figs. 1 and 5. The cams engage in both directions with the toes b upon the follower-shafts, and their configuration is such as to reciprocate each follower at the proper intervals. The front end of the cylinder is closed by a perforated plate of steel H, having numerous sharp-edged holes a at close intervals and a smooth inner surface, against which the face of the head M fits closely.

The upper portion of the plate H is cut away, as shown at L, the amount removed being somewhat less than a quadrant, to form an aperture for the introduction of the meat. A hopper O is attached to the outside of the plate H around this aperture L, and said hopper is preferably provided with a hinged spring-flap P, by which its contents can be pressed downward and through the aperture L.

To secure the plate H in position I provide three or more overhanging lugs Q Q' Q² upon the front end of the cylinder B, each of said lugs being formed with a transverse wedge-shaped slot q (see Fig. 6) on the inner side of its overhanging portion.

Upon the outer periphery of the perforated plate H a corresponding number of radially-projecting lugs h h' h² are formed, all of which are slightly wedge-shaped to fit within the slots q. To secure the plate H in position it is held up against the end of the cylinder B, and then turned until the lugs h h' h² engage in said slots.

In the lug h, I form an inclined depression i, and I provide the lug Q (in which lug h is to engage) with a thumb-screw k, adapted to bear against the inclined side of the depression i. By turning the screw k inward the pressure upon this inclination will slightly rotate the plate H, and by reason of the wedge-shaped form of the lugs h h' h² and of the slots q in the lugs Q Q' Q² this rotation will force the plate H inward or toward the face of the rotating head M. In this manner a close contact between the head and the inner surface of the plate can always be maintained—a feature which is very important for producing the proper cutting action.

The operation of the machine is as follows: Pieces of meat T being placed within the hopper O, they are gently pressed downward, either by the hand or by means of the flap P, and forced through the aperture L of the plate. By reference to the configuration of the cam-surfaces I J it will be seen that the follower within the cavity, which for the time being is opposite to the aperture L, is retracted inward to its greatest extent, and thus the cavity is open to receive the meat. As the head rotates in the direction of the arrow, the piece of meat, if not totally within the cavity, is sheared off between the edge of the cavity and the edge of the aperture L in passing. The forward movement of the follower then commences and the meat is squeezed up against the inner surface of the plate H and into the perforations thereof, so that fragments t are sheared off as the rotation of the head carries the edge of the cavity past said perforations. The forward movement of the follower continues until it is substantially flush with the face of the head M, which position it assumes just before it again reaches the aperture L, when the sudden descent of the cam-inclines (see S, Fig. 2) rapidly retracts the follower and opens the cavity to its fullest extent for a repetition of the operation. This series of movements is of course performed by each of the followers F F' F² in succession. The meat is thus effectually cut up, and since each follower is pushed forward until it is in contact with the plate no meat can remain in any of the cavities. In case of bone or other hard substance being introduced with the meat it is only necessary to reverse the rotation of the head, so as to bring the cavity containing the obstruction opposite the opening L, through which the entire contents of the cavity can be immediately removed. Furthermore, since the meat does not enter the cylinder proper at all, but only is in contact with the followers, the inner surfaces of the cavities, and the perforated plate, the machine can be instantly and readily cleansed by merely removing the plate and wiping out the cavities. The cleaning is thus performed without disarranging any of the working parts.

Having thus described my invention, I desire to state that I do not limit my claims to the use of any particular number of cavities, nor to the precise location of the aperture for introducing the meat; but

I claim in a meat-cutter—

1. The combination, with a perforated plate, of a rotating head provided with a cavity on the side adjacent to said plate, a follower within said cavity, and means whereby the follower is actuated away from and toward said plate during the rotation of the head, substantially as set forth.

2. The combination, with a perforated plate having an aperture for the introduction of meat, of a rotating head provided with a cavity on the side adjacent to said plate, a follower within said cavity, and means whereby said follower is actuated away from and toward said plate during the rotation of the head, substantially as set forth.

3. The combination, with a perforated plate having an aperture for the introduction of meat, of a hopper arranged upon the outside and surrounding said aperture, a rotating head provided with a cavity on the side adjacent to said plate, a follower within said cavity, and means whereby said follower is actuated away from and toward said plate during the rotation of the head, substantially as set forth.

4. The combination, with the rotating head having a cavity therein, of the follower arranged in said cavity, the follower-shaft having a projecting toe, and the double cams I J, engaging above and below said toe, substantially as set forth, whereby a positive movement of the follower in each direction is effected by the rotation of the head.

MICHAEL HOFBAUER.

Witnesses:
CHARLES HOFBAUER,
JAMES H. BELL.